US012653183B2

(12) United States Patent
Staples

(10) Patent No.: US 12,653,183 B2
(45) Date of Patent: Jun. 16, 2026

(54) HYGROSCOPIC SALT MICROENCAPSULATION, AND USES THEREOF

(71) Applicant: ANIMAL CONTROL TECHNOLOGIES (AUSTRALIA) PTY LTD, Somerton (AU)

(72) Inventor: Linton Staples, Somerton (AU)

(73) Assignee: ANIMAL CONTROL TECHNOLOGIES (AUSTRALIA) PTY LTD, Somerton (AU)

( * ) Notice: Subject to any disclaimer, the term of this patent is extended or adjusted under 35 U.S.C. 154(b) by 438 days.

(21) Appl. No.: 18/034,477

(22) PCT Filed: Oct. 29, 2021

(86) PCT No.: PCT/AU2021/051275
§ 371 (c)(1),
(2) Date: Apr. 28, 2023

(87) PCT Pub. No.: WO2022/087684
PCT Pub. Date: May 5, 2022

(65) Prior Publication Data
US 2024/0008476 A1 Jan. 11, 2024

(30) Foreign Application Priority Data

Oct. 30, 2020 (AU) ................................ 2020903961
Jul. 7, 2021 (AU) ................................ 2021902070

(51) Int. Cl.
*A01N 25/00* (2006.01)
*A01N 25/10* (2006.01)
*A01N 59/00* (2006.01)
*A01P 15/00* (2006.01)

(52) U.S. Cl.
CPC ........... *A01N 25/002* (2013.01); *A01N 25/10* (2013.01); *A01N 59/00* (2013.01); *A01P 15/00* (2021.08)

(58) Field of Classification Search
CPC ...... A01N 25/002; A01N 25/10; A01N 59/00;

A01N 25/28; A01N 2300/00; A01P 15/00; A61K 33/00; A61K 9/0056; A61K 9/50; A61K 9/5015; A61K 9/5047; A61K 47/12
See application file for complete search history.

(56) References Cited

U.S. PATENT DOCUMENTS

2014/0056957 A1* 2/2014 Chen ...................... A61P 17/02
424/490

FOREIGN PATENT DOCUMENTS

| | | |
|---|---|---|
| CN | 1357406 A | 7/2002 |
| CN | 1850065 A | 10/2006 |
| CN | 102578387 A | 7/2012 |
| WO | 2008104028 A1 | 9/2008 |
| WO | 2010151150 A2 | 12/2010 |
| WO | 2014031491 A2 | 2/2014 |
| WO | 2018039739 A1 | 3/2018 |

OTHER PUBLICATIONS

Lee Shapiro, Charles Eason, Craig Bunt, Steve Hix, Paul Aylett, and Duncan MacMorran, "Efficacy of encapsulated sodium nitrite as a new tool for feral pig management", Journal of Pest Science (2016) 89:489-495 (Year: 2016).*
International Search Report for corresponding application PCT/PCT/AU2021/051275 filed Oct. 29, 2021; Mail date Jan. 11, 2022.
Written Opinion for corresponding application PCT/PCT/AU2021/051275 filed Oct. 29, 2021; Mail date Jan. 11, 2022.

* cited by examiner

*Primary Examiner* — Mina Haghighatian
*Assistant Examiner* — Nathan W Schlientz
(74) *Attorney, Agent, or Firm* — CANTOR COLBURN LLP

(57) ABSTRACT

The present invention relates to microencapsulation technology and specifically, nitrite salt microencapsulation and uses of microencapsulated nitrite in the manufacture of animal pest baits and toxic feed mixtures, especially baits and toxic feed mixtures to be used in humane methods for controlling pig and possum populations.

20 Claims, No Drawings

HYGROSCOPIC SALT MICROENCAPSULATION, AND USES THEREOF

FIELD

The present invention relates to microencapsulation technology and specifically, nitrite salt microencapsulation and uses of microencapsulated nitrite in the manufacture of animal pest baits and toxic feed mixtures, especially baits and toxic feed mixtures to be used in humane methods for controlling pig and possum populations.

BACKGROUND

Feral pigs cause environmental, biodiversity, and agricultural damage and pose a risk for the spread of diseases that can be on a large geographical scale so feral pigs have direct impact on the environment, agricultural production, rural industries and semi urban amenity.

In Australia, feral pigs are estimated to number in excess of 4 million with some estimates as high as 25 million. Feral pigs occupy some 40% of the land mass of Australia and can breed rapidly in favourable conditions. These population estimates mean that at times of peak abundance there may be more feral pigs in Australia than grazed cattle. Feral pigs inhabit, and are well adapted to a wide range of habitats that include sub-alpine, temperate, sub-tropical, tropical and arid zones, and they are present in most Australian states and territories.

Furthermore, in the United States, the presence of some 8 million feral pigs (also referred to as hogs, boar, or swine) has been reported in some 34 states ranging from California to Virginia, the majority residing in Texas and other southern states including Louisiana, Mississippi, and Florida. Feral pigs are the most abundant introduced ungulate in the United States and their density within ranges and range areas are expanding rapidly.

Feral pigs have a very high fecundity and frequently raise litters in excess of 6 piglets per breeding sow. Thus, the capacity for feral pig populations to respond to control measures or to totally exploit a food supply is great, so large-scale and sustained control measures to lower populations are needed.

Feral pigs adversely impact agricultural production, environments and ecosystems. A number of studies have identified a range of environmental and agricultural problems arising from feral pig infestations (Alexiou (1984) Effects of feral pigs (*Sus scrofa*) on sub-alpine vegetation at Smokers Gap, ACT, Proceedings of Ecological Society of Australia, 12: 135-142; Tisdell, C. A., (1982) Wild Pigs: Environmental Pest or Economic Resource? Pergamon Press, Sydney; Miller, B. and Mullette, K., (1985) Rehabilitation of an endangered Australian bird: the Lord Howe Island Wood-hen, *Tricholimnas sybvestris, Biological Conservation,* 34: 55-95; Mitchell, J. and Mayer, R., (1997). Digging by feral pigs in the wet tropics world heritage area of north Queensland, *Wildlife Research,* 24: 591-601; Choquenot, D., McIlroy, J. and Korn, T., (1996) Managing Vertebrate Pests: Feral Pigs (Ed. M. Bomford) Bureau of Resource Sciences, Australian Government Publishing Service, Canberra 163 pp; Mitchell, J., (2000) Ecology and management of feral pigs in tropical rainforest, Unpublished PhD Thesis, James Cook University of North Queensland, Townsville; Hone, J., (2002) Feral pigs in Namadgi National Park: dynamics, impacts and management, *Biological Conservation* 105: 231-242); Singer, F. J., Swank, W. T., and Clebsch, E. E. C., Effects of wild pig rooting in a deciduous forest., *Wildlife Management* 48: 464-473; Lacki, M. J., and Lancin, R. A., (1986) Effects of wild pigs on beech growth in Great Smoky Mountains National Park, *Journal of Wildlife Management* 50: 655-659. The key points from these various studies are summarised below.

The predatory behaviour of feral pigs causes major economic damage for animal production enterprises over wide areas. The damage is so severe that some areas cannot sustain productive grazing of livestock such as sheep due solely to the widespread infestation of feral pigs. The species' impact on agricultural production in Australia has been conservatively estimated to be in excess of 100 million Australian dollars annually.

Feral pigs also cause significant damage to the environment due to their destructive foraging habits which include digging for plant roots or soil fauna including worms (rooting) and consumption of plants and plant root systems. This destructive behaviour, and their need to access areas of food resource or water wallowing points, can damage infrastructure including fencing, dams and levy banks and also causes damage wide areas of fragile riparian habitat. Feral pig fecal contamination of waterways and water storages is also a concern. Their effect on native animal species is unknown but is likely to be severe in view of their predatory behaviour and competition for food resources. Feral pigs are known to aggressively predate new born lambs to such an extent that profitable sheep farming has been discontinued in large areas as a result of the incursion of feral pigs into these areas. It is likely also that feral pigs adversely impact on native wild life species though these impacts are not well quantified.

Apart from direct damage to grazing enterprises and the environment, feral pigs also harbour several major human and animal diseases. Many diseases are zoonotic and the pig provides an ideal amplifying host. Japanese encephalitis virus, leptospirosis, brucellosis and melioidosis have already been detected in feral pigs in Australia. However, an even greater risk comes if there is an incursion of foot and mouth disease (FMD) virus into the feral pig population, where the cloven hoofed pigs provide an amplifying host and virus carrier that is widely distributed and highly mobile.

In the United States, pseudorabies virus (PRV) has been eradicated from domestic pigs however PRV continues to circulate in feral pig and raccoon populations. Accordingly, feral omnivore populations can also be a reservoir for fresh PRV outbreaks.

More recent findings under experimental conditions have linked the potential transmission of Ebola viruses in non-human primates to contact with caged pigs which have been reported in laboratory trials to carry the virus in lesions focussed in the lungs without a lethal outcome for the pig.

Details of the environmental, human health, animal health and agricultural production problems that arise already, or which might arise, from an unchecked expansion in feral pig numbers are provided in the book "*Managing Vertebrate Pests: Feral Pigs*" (Choquenot, D., McIlroy, J. and Korn, T., (1996) Managing Vertebrate Pests: Feral Pigs (Ed. M. Bomford) Bureau of Resource Sciences, Australian Government Publishing Service, Canberra 163 pp. Infestation of other omnivorous species such as raccoons, collared peccaries, opossums, possums and rodents with viruses or other pathogens known in pigs can give rise to similar adverse agricultural, environmental, financial and health concerns in various countries. The recent spread of African Swine Fever (ASF) virus in feral pig populations also now poses a considerable threat to farmed pig populations globally. This highly lethal and untreatable disease has caused the urgent destruction of some 250 million farme pigs in China alone.

There is therefore a considerable effort focussed on a reduction of the risks posed by feral omnivorous species in Australia, United States, New Zealand, Europe and South America and other parts of the world which have unchecked populations of such species.

Despite their impact, the control of omnivores such as feral pigs, is generally time-consuming, ad-hoc and reactive rather than pro-active management. Many techniques are currently employed for mainly localized control. The methods include baiting with poison baits, shooting (with ground teams or by helicopter or fixed wing based marksmen), trapping (for destruction or harvesting), and fencing (to attempt to exclude pigs from an area). It is recognized that, while no single technique can be expected to be 100% effective in all situations, the broad-scale and integrated baiting campaigns are most cost-effective for reducing and maintaining feral omnivore populations at low densities across large areas. Typical baiting campaigns include ground baiting after pigs are clustered to a site of habitual feeding or aerial baiting where the bait is dropped from an aircraft into the loci of the target omnivore population to be controlled.

Lethal baiting campaigns include the use of various poisons, for instance, sodium fluoroacetate (1080) which is placed in or deposited on cereal grains, fermented grain, compressed bran/pollard pellet baits, fresh or dried meat, offal, carcasses, lupin seeds, and fruit and vegetables and in manufactured baits. Of these, the use of soaked or dry wheat grain or fresh meat baits are the most common. Feral pigs have also been baited with warfarin soaked into grain or by applying yellow phosphorus suspended in carbon bisulphide onto carcass offal that is scavenged by the pigs. The use of yellow phosphorus as a poison is allowed only under permit in one state of Australia and is banned in other jurisdictions as it is not targeted or humane. The use of sodium fluoroacetate is effective but requires high doses of the toxin as pigs are relatively less susceptible than certain other pest species such as foxes and rabbits and feral cats. Since large quantities of sodium flouroacetate poison are required to kill pigs that are needed for more susceptible species such as wild dogs and foxes and rabbit, this high doing requirement poses a risk to other species that may take some bait materials such as meat and grain that are attractive to them. Manufactured pig baits pose lower risk of non-target uptake due to their demonstrated target specificity and lack of attractiveness to certain non-target species.

Of the various control means discussed above, poison baiting of feral pigs and other omnivore populations is recognised as one of the most effective means of controlling such populations and reducing the damage they cause. Unfortunately however, two of the main problems with many of the bait types made from grains or meat and carcass offal or pellets is that they require high dose levels of toxicants and that they exhibit poor target specificity. Accordingly, while the commonly employed baiting campaigns may prove effective in controlling feral omnivore (e.g. pig) numbers in a particular area, such campaigns may also pose a risk to or adversely affect individuals of other species of animals which may be desired or native.

Other disadvantages of the present baiting regime can be attributed directly to the specific poison used. For instance, a disadvantage of 1080 is that feral pigs appear to be relatively resistant to the effects of the poison compared to rabbits, foxes, and wild dogs for which it is a more ideal poison. For example, during captive trials with bait delivered 1080, (McIlroy et al, Australian Wildlife Research 16: 195-202) wild dogs required 0.11 mg/kg to receive an $LD_{50}$ dose whereas feral pigs were reported to require at least 1 mg/kg and some as high as up to 4.11 mg/kg (O'Brien et al, Australian Wildlife Research 15: 285-291) this being up to a 40 fold multiple of the dose used for canid pests.

Moreover, while the terminal toxic events associated with 1080 toxicosis are not thought to be accompanied by conscious pain, the effects of blockade of energy producing enzymes can raise blood citrate levels and reduce free calcium that is necessary for muscle coordination. As a consequence there are disturbances in nervous control of muscle function due, it is thought, to accumulation of citrate in blood and its ability to chelate and remove extracellular calcium ions (hypocalcaemia), thus effects on behaviour that can appear unpleasant to the untrained observer. Humans that have recovered from nearly lethal exposures to 1080 have not recalled pain after the event however the final phases of toxicosis have been likened to hypoglycaemic or epileptic fitting. Similarly humans accidentally exposed to over doses of citrate as an anticlotting agent in blood transfusion, exhibit similar painless spasm associated with the induced hypocalcaemia. Apart from the limitation of high required dosing, sodium fluoracetate is a naturally occurring plant toxin in some Australia plant species and this leads to partial evolutionary tolerance for many native herbivore species in Australia. For this reason and others, 1080 remains presently one of the best toxin choices for feral pig management in Australia but this chemical is not available for pig control in the USA or elsewhere e in the world. Nevertheless, the high doses of sodium fluoroacetate that are required to get reliable lethal control of feral pigs mean that this is not a perfectly suitable toxin for pig management especially since such high doses may put potential non-target species at risk. This toxin can take up to 12 hours for pigs to die and so carcasses are often at some distance from baiting points and scattered. This is an impediment to use of this toxin in a disease control situation where carcass recovery is necessary to prevent infection spread. This risk to non-target species is particularly high when substrates such as grain and fresh carcass meat are used as bait carriers since some non-target animals show a preference for these substrates and the removal of baits by non-target species can reduce the bait available for the feral pig target animals, making some baiting programs more expensive and less effective.

People poisoned with other toxins such as phosphorus (CSSP) or strychnine have reported substantial pain and suffering and it is highly likely that such poisons are too inhumane to be used to control feral animals such as a pig. Similarly, while warfarin is used therapeutically in low doses for humans suffering from blood clotting disorders and this use is not associated with pain, provided that no uncontrolled haemhorrage is induced. However, the use of this anticoagulant in large animals such as feral pigs, which are susceptible to this anticoagulant, may give rise to delayed effects, painful haemorrhaging and swelling in sensitive tissues and protracted suffering in some animals and therefore it is also not a preferred poison for this application.

This would indicate that none of these poisons and conventionally used food based baits, are perfectly suitable or represent perfectly humane alternatives for eradicating or controlling this pest species.

In addition to feral pig species there is also a need from time to time to humanely euthanize populations of domestic pigs, for example, where there is a disease outbreak within a piggery. For instance, African swine fever (ASF) is a contagious viral disease of both domestic and feral (wild) pigs. Currently, there is no vaccine. ASF kills about 80% of the pigs it infects. In the acute form of the disease is caused by highly virulent strains, where pigs develop a high fever, but show no other noticeable symptoms for the first few days They then gradually lose their appetites and become depressed. In white-skinned pigs, the extremities turn blueish-purple and hemorrhages become apparent on the ears and abdomen.

Groups of infected pigs lie huddled together shivering, breathing abnormally, and sometimes coughing. If forced to stand, they appear unsteady on their legs. Within a few days of infection, they suffer extensive haemorrhaging, enter a comatose state and then die. In pregnant sows, spontaneous abortions occur.

In milder infections, affected pigs lose weight, become thin, and develop signs of pneumonia, skin ulcers, and swollen joints.

The clinical symptoms of ASFV infection are very similar to classical swine fever, and the two diseases normally have to be distinguished by laboratory diagnosis.

The virus can be spread by ticks, and possibly other biting insects but also by swine eating pork products that contain the virus or via exposure to contaminated areas such as pig pens. The National Pig Association, a UK industry body, states that the virus can also be transmitted by direct or indirect contact with infected pigs, faeces or body fluids. As the virus may survive 11 days in pig faeces, and months or years in pork products, the association advises strict biosecurity measures for pig farms including a three-day quarantine on entering the UK, and avoiding both pigs and areas where wild boar are found.

One of the most common ways of euthanizing populations of infected pigs is with the use of captive bolt guns. While fast and effective it does cause distress to pigs and to operators, poses problems for removal of carcasses and the blood produced from this process may exacerbate contamination of piggeries and increase the spread of infection.

Nitrite salts have been recently reported to be potentially suitable for the control of pig populations (*Sus scrofa*) and other omnivorous animals such as pest brush tail possums (*Trichosurus vulpecula*) in New Zealand. Sodium nitrite in particular is commonly approved and used at very low doses for the preservation of many foods where it reduces the risk of bacterial contamination and improves the colour of certain meat products. While the use at low doses as a food preservative poses low risk, in high doses it causes the conversion of normal haemoglobin to methaemoglobin by acting as a direct oxidiser of the iron molecule in the haem protein, Since methaemoglobin is unable to effectively transport oxygen to the brain and other tissues, an animal that achieves blood levels of methaemoglobin above approximately 70% of all heamoglobin suffers from an acute metabolic anoxaemia and will become unconscious and die. The clinical effect of methaemoglobineamia is similar to the effects of carbon monoxide gas that binds strongly to normal haemoglobin to also prevent oxygen transport to essential organs and the brain. The effect of nitrite induced methemoglobinaemia in preventing oxygen transport and is therefore more humane and faster than the actions of most if not all other poisons. Moreover, relative to other animals, the pig (also known as swine or hog) has a deficiency of the enzyme methaemoglobin reductase that converts methaemoglobin back to normal haemoglobin, is present at higher levels in many other animals that in pigs. This enzyme acts to protect most animals from the accumulation of low to moderate levels of methaemoglobin that can arise naturally with exposure to any oxidising compound such as even nitrite present in some foods and water. The pig is thus especially susceptible to this type of poison as it has a deficiency in the means to reverse the poisoning process of methaemoglobin formation.

Despite its effectiveness as a toxicant, sodium nitrite is an unstable molecule that can oxidise and which can react also with other chemicals that are present in foods. Sodium nitrite is highly hygroscopic and will dissolve in water readily and then, after dissolution of atmospheric carbon dioxide in the water to form carbonic acid, will undergo a series of breakdown reactions. Nitrites are highly polar and may even obtain acid (H+) by deprotonation of water molecule to generate a highly alkaline initial solution. The number of potential degradation pathways for interaction with other components of a bait comprising sodium nitrite are large but one breakdown product is nitric oxide gas (NO) that itself is unstable but which can act as a corrosive agent, a chemical messenger and a vasodilator, and which may oxidise exothermically in air to nitrogen dioxide gas ($NO_2$). Nitrogen dioxide may be converted to nitrous acid ($HNO_2$) which can then combine with itself to generate more nitrous acid and water and also ultimately nitric acid. ($HNO_3$). These reactions, including the natural formation of nitrate as part of the soil nitrogen cycle, provide for ultimate degradation of nitrite in the environment. This lack of persistence and total degradation is a valuable feature from an environmental perspective but this instability is problematical when seeking to use the nitrite salts in bait formulations. Not only do the degradation products cause chemical reactions within the bait but the direct breakdown products are all noxious to mucous membranes such as in the sensitive pig nose. Sodium nitrite is also salty tasting and pigs are generally aversive to high salt diets. Thus, the use of sodium nitrite or other nitrite salts as a toxin in large amounts in bait products poses formulation challenges to achieve a bait that is stable during storage and use but at the same time is able to deliver larger quantities of the toxicant to the pig in a bait that remains palatable to the pig.

WO 2010/151150 to MacMorran and Eason discloses a nitrite bait formulation in which the nitrite within the bait is encapsulated with zein protein with an approximate amount of nitrite of 80% wt/wt. The results shown in the examples are those obtained with the use of freshly prepared baits. In the hands of the present inventors, these baits, while effective when fresh, very slowly degrade over time while stored, decreasing their effectiveness and palatabilty over time. It is postulated that this degradation is taking effect based on the cascade of nitrite breakdown conditions discussed above. Moreover, the protein coatings require for application a binary solvent system that includes some water and this has potential to become absorbed by the nitrite salts before an effective sealing coating is achieved.

Accordingly, an improved method is required to protect the sodium nitrite in the bait carrier system to achieve stability of the formulation over extended shelf-lives by, in part, reducing the production of noxious or aversive breakdown products which is thought to diminish the effectiveness of the bait. If such stability can be achieved this would in turn reduce the possibility of the target pig detecting the nitrite and lead to an increase in voluntary uptake.

Any new variation of a bait formulation will still need to also provide effective release of the nitrite into the animal to induce high levels of methaemoglobinaemia and thus cause a quick and painless death without suffering.

The present invention serves to address these long-term stability shortcomings which currently exist in the art while at the same time providing an effective bait formulation which serves to humanely control feral omnivorous pest populations.

There is also a need to provide humane means for euthanizing populations of domestic pigs quickly should a piggery require an immediate de-population, for instance, during an infection outbreak.

Thus the present invention also serves this currently existing shortcoming.

SUMMARY OF INVENTION

The present invention has been driven by the necessity to improve the delivery form of sodium nitrite as a toxicant in pest bait formulations. The present inventors have found that the use of specific encapsulation ingredients in conjunction with a specific plasticizer provides an unexpected significant improvement in stability compared to various other combinations of encapsulation ingredients trialled (such as wax, lipids, acrylic polymers, glycerides, fatty acids and fatty alcohols, shellac, PVP/Zein protein and paraffin) in terms of process scale-up and better encapsulation coverage such that leaching of nitrite due to edge effects is greatly minimised within the final bait formulation This has led to an improved formulation which is superior in terms of moisture barrier properties and long term storage stability while also delivering effective physiological quantities of nitrite in vivo.

The present invention is predicated on the discovery that an unexpected improvement in a coating material for nitrite salts can be realised using ethyl cellulose (EC) and linoleic acid (LA) as a plasticizer in an amount from about 99:1 to about 99.99:0.01 as a % weight to weight ratio (EC:LA).

Accordingly, in an aspect the invention provides ethyl cellulose/linoleic acid (EC/LA) microencapsulated sodium nitrite microspheres, wherein the ratio range of ethyl cellulose to linoleic acid is in an amount from about 99:1 to about 99.99:0.01 as a % weight to weight ratio.

The present invention also provides a bait composition for omnivorous feral animals comprising a carrier material and sodium nitrite, wherein the carrier material is a lipophilic carrier and the sodium nitrite is presented in the form of ethyl cellulose/linoleic acid microencapsulated sodium nitrite microspheres, wherein the ratio range of ethyl cellulose to linoleic acid is in an amount from about 99:1 to about 99.99:0.01 as a % weight to weight ratio.

In a further aspect the present invention also provides a toxic feed composition for euthanizing pig populations comprising a carrier material and sodium nitrite, wherein the carrier material is a pig feed ingredient or combination thereof, and the sodium nitrite is presented in the form of ethyl cellulose/linoleic acid microencapsulated sodium nitrite microspheres, wherein the ratio range of ethyl cellulose to linoleic acid is in an amount from about 99:1 to about 99.99:0.01 as a % weight to weight ratio.

In an embodiment and with reference to the above aspect the method may be applied to a pig population which has been exposed to or infected with pathogens which pose a clinically serious risk or lethal risk to the pig population or may be passed from pigs to humans. For instance, in an embodiment the toxic feed composition may be used for euthanizing pig a population which has been exposed to or infected with African Swine Fever (ASF).

In an embodiment the ethyl cellulose/linoleic acid coating material is added to the nitrite salt to form the microspheres at from about 2.5 to 30% weight to weight based on ethyl cellulose/linoleic acid to nitrite salt. Preferably the nitrite salt is in granular form.

Therefore, the present invention also provides a bait composition for omnivorous feral animals comprising a carrier material and sodium nitrite, wherein the carrier material is a lipophilic carrier and the sodium nitrite is presented in the form of ethyl cellulose/linoleic acid microencapsulated sodium nitrite microspheres, wherein the ratio range of ethyl cellulose to linoleic acid is in an amount from about 99:1 to about 99.99:0.01 as a % weight to weight ratio and the ethyl cellulose/linoleic acid coating material is added to the nitrite salt to form the microspheres at from about 2.5 to 30% weight to weight based on ethyl cellulose/linoleic acid to nitrite salt.

In certain embodiments the inventors have demonstrated additional stability improvement by incorporating a pH stabiliser into the carrier material, to afford a pH to the bait of greater than pH 7. In an embodiment calcium carbonate can be added to the carrier material to get the pH>7 as it was found that sodium nitrite in the bait composition is unstable at pH<7. Lime can also be used as a pH modifier but so could certain buffers.

The present invention also provides a bait composition for omnivorous feral animals comprising a carrier material and sodium nitrite, wherein the carrier material is a lipophilic carrier and the sodium nitrite is presented in the form of ethyl cellulose/linoleic acid microencapsulated sodium nitrite microspheres, wherein the ratio range of ethyl cellulose to linoleic acid is in an amount from about 99:1 to about 99.99:0.01 as a % weight to weight ratio, and the ethyl cellulose/linoleic acid coating material is added to the nitrite salt to form the microspheres at from about 2.5 to 30% weight to weight based on ethyl cellulose/linoleic acid to nitrite salt, and the carrier material comprises a pH stability agent such that the bait maintains a pH of greater than 7. It is worth noting that this is done with only ethanol as a solvent so also removes the risk of water that occurs when using binary solvents that contain water.

The present invention also provides a toxic feed composition for euthanizing pig populations comprising a carrier material and sodium nitrite, wherein the carrier material is a pig feed ingredient or combination thereof, and the sodium nitrite is presented in the form of ethyl cellulose/linoleic acid microencapsulated sodium nitrite microspheres, wherein the ratio range of ethyl cellulose to linoleic acid is in an amount from about 99:1 to about 99.99:0.01 as a % weight to weight ratio and the ethyl cellulose/linoleic acid coating material is added to the nitrite salt to form the microspheres at from about 2.5 to 30% weight to weight based on ethyl cellulose/linoleic acid to nitrite salt.

The invention also provides a method for humanely controlling omnivorous feral animals, in particular feral pigs and possums, including the step of dispersing within the area of foraging of said omnivorous feral animals a bait composition as disclosed herein.

The invention also provides a method for humanely controlling pig populations, in particular farmed pigs, including the step of dispersing within the area of foraging of said pigs a toxic feed composition as disclosed herein The present invention further provides a method of preparing a bait composition for omnivorous feral animals comprising a lipophilic carrier material and sodium nitrite salt, wherein the sodium nitrite is presented in the form of ethyl cellulose/linoleic acid microencapsulated sodium nitrite microspheres, wherein the ratio range of ethyl cellulose to linoleic acid is in an amount from about 99:1 to about 99.99:0.01 as a % weight to weight ratio, said method comprising:

(a) optionally drying granular sodium nitrite to constant weight so that substantially all moisture is reduced;

(b) encapsulating the granular sodium nitrite from step (a) with a mixture of the ethyl cellulose and linoleic acid by either pan coating or fluid bed coating techniques using a volatile organic solvent; and (c) mixing the encapsulated material with the carrier material to form the bait composition.

The present invention further provides a method of preparing a bait composition for omnivorous feral animals comprising a lipophilic carrier material and sodium nitrite salt, wherein the sodium nitrite is presented in the form of ethyl cellulose/linoleic acid microencapsulated sodium nitrite microspheres, wherein the ratio range of ethyl cellulose to linoleic acid is in an amount from about 99:1 to about 99.99:0.01 as a % weight to weight ratio, and the carrier material comprises a pH stability agent such that the bait maintains a pH of about 7-8 and the amount of ethyl cellulose/linoleic acid is about 3.5 to 20% by weight relative to the amount of sodium nitrite, said method comprising:

(a) optionally drying granular sodium nitrite to constant weight so that substantially all moisture is removed;

(b) encapsulating the granular sodium nitrite from step (a) with a mixture of the ethyl cellulose and linoleic acid by either pan coating or fluid bed coating techniques using a volatile organic solvent; and (c) mixing the encapsulated material with the carrier material comprising a pH stability agent to form the bait composition.

The present invention further provides a method of preparing a toxic feed composition for pig populations comprising a carrier material and sodium nitrite salt, wherein the carrier material is a pig feed ingredient or combination thereof, wherein the sodium nitrite is presented in the form of ethyl cellulose/linoleic acid microencapsulated sodium nitrite microspheres, wherein the ratio range of ethyl cellulose to linoleic acid is in an amount from about 99:1 to about 99.99:0.01 as a % weight to weight ratio, said method comprising:

(d) optionally drying granular sodium nitrite to constant weight so that substantially all moisture is reduced;

(e) encapsulating the granular sodium nitrite from step (a) with a mixture of the ethyl cellulose and linoleic acid by either pan coating or fluid bed coating techniques using a volatile organic solvent; and (f) mixing the encapsulated material with the carrier material to form the toxic feed composition.

In certain embodiments the volatile organic solvent is water free or substantially water free.

DETAILED DESCRIPTION OF THE INVENTION

The term "microspheres" as used herein refers to substantially spherical discreet particles with size varying between about 100 nm to about 1 mm. Also, referred to as "microcapsules" the microspheres of the present invention are characterised as having sodium nitrite as the core substance with a mixture of ethyl cellulose (EC) and linoleic acid (LA) plasticiser as a coating or encapsulating material over said core substance. The microspheres of the present invention are approximately spherical in shape but are not entirely regular with some individual particles showing adhesion of small particles to the surface of larger ones. At a magnification of 100 the surface of the sodium nitrite microspheres is rough with nodule like small particles adhering to the large nitrite granules. It has been shown that after the coating process these combination of particles are not easily disrupted or damaged by physical forces and are often coated as one particle. Time of flight microscopy studies have shown almost complete coverage/coating with the encapsulating materials disclosed herein.

In an embodiment the ethyl cellulose/linoleic acid coating material is added to sodium nitrite at from about 3.5 to 20% as a weight to weight ratio, such as about 3.6, 3.8, 4.0, 4.2, 4.4, 4.6, 4.8, 5.0, 5.2, 5.4, 5.6, 5.8, 6.0, 6.2, 6.4, 6.6, 6.8, 7.0, 7.2, 7.4, 7.6, 7.8, 8.0, 8.2, 8.4, 8.6, 8.8, 9.0, 9.2, 9.4, 9.6, 9.8, 10, 10.2, 10.4, 10.6, 10.8, 11.0, 11.2, 11.4, 11.6, 11.8, 12.0, 12.2, 12.4, 12.6, 12.8, 13.0, 13.2, 13.4, 13.6, 13.8, 14.0, 14.2, 14.4, 14.6, 14.8, 15.0, 15.2, 15.4, 15.8, 16.0, 16.2, 16.4, 16.6, 16.8, 17.0, 17.2, 17.4, 17.6, 17.8, 18.0, 18.2, 18.4, 18.6, 18.8, 19.0 19.2, 19.4, 19.6 to about 19.8% weight to weight.

In an embodiment the amount of ethyl cellulose/linoleic acid is about 5-10% by weight relative to the amount of sodium nitrite.

In an embodiment the amount of ethyl cellulose/linoleic acid is about 5% by weight relative to the amount of sodium nitrite.

In an embodiment the microspheres of the present invention are on average between about 100 to 1000 microns. In another embodiment the microspheres are on average between about 200 to 750 microns, such as 210, 220, 230, 250, 270, 290, 310, 330, 350, 370, 380, 390, 410, 430, 450, 470, 490, 500, 510, 530, 550, 570, 590, 600, 610, 620, 630, 640, 660, 680, 690, 700, 710, 720, 730, or 740 microns, or within a range between any of the two aforementioned values. It will be appreciated that the average size of the microspheres will depend on their method of production. In an embodiment the microspheres are prepared by pan coating or fluid bed coating techniques.

The term "bait" as used herein refers to the combination of a purposively selected carrier material and active agent for the express purpose of preparing a pest control agent wherein the carrier material and the bait as a whole are palatable and at least partially edible by a target pest. Accordingly, the "bait" of the present invention is a purposely manufactured pest control agent which is to be contrasted with, for instance, a naturally occurring material (e.g., plant material that may contain natural quantities of sodium nitrite) and is distinguished from or, for instance, meat sausage which may contain quantities of the active agent or where the active agent is added in an unprotected form and at a very low dose for the purpose of flavour enhancement or preservation against certain bacteria such as botulin's or *salmonella*.

The term "toxic feed composition" as used herein refers to the combination of a carrier material which is a pig feed ingredient or combination thereof, and active agent for the express purpose of euthanizing a pig population wherein the carrier material and the active agent (in this case encapsulated sodium nitrite) when combined are palatable and at least partially edible by a farmed/domesticated pig. In relation to suitable pig feed ingredient(s) this may include grain, nuts, sugars; suitable plant derived components include milled grains, pollard, bran, maize (corn), plant fibres, flour, fruit, vegetables, seeds, sugars (e.g. molasses) cereal and straw and mixtures thereof. As such the invention contemplates the mixing of the microencapsulated sodium nitrite into the normal feed of the pig population, in quantities to provide a lethal dosage.

In an embodiment the toxic feed composition is a mixed combination of the microencapsulated sodium nitrite with dry pig feed ingredients.

The invention relates to the humane control of omnivorous feral animals, in particular, feral pigs and feral possums and also domesticated pigs housed at a piggery. Accordingly, the terms "humane" and "humanely" as used herein refer to methods which do not cause undue distress to the target animal species. Signs of distress which are avoided or minimised by the present invention include haemorrhaging, excessive vomiting, vocalisation, severe central nervous system disruption (including hyperexcitability, convulsions, ataxia, leg trembling and leg paddling whilst prone) and prolonged death. Preferably death occurs within 1-3 hours after ingestion of a bait of the present invention with few if any symptoms other than progressive recumbency, unconsciousness, feeble breathing and death due to the effects of the nitrite in converting normal haemoglobin to methaemoglobin that does not transport oxygen in blood.

In relation to the present invention where the target pests are omnivorous feral animals, these are preferably feral pigs and possums. In in this embodiment the present invention contemplates the use of stable baits of the present invention to the control of feral pig populations. In another embodiment the baits of the present invention are directed to the control of feral possum populations. These a purpose made baits which are able to remain stable when exposed to outside weather conditions for weeks or months at a time.

In relation to the present invention where the target pests are domesticated pigs housed in a piggery the present invention contemplates the use of readily made combinations of pig feed ingredients with the microencapsulated sodium nitrite of the present invention (i.e., toxic feed compositions) to the control of pig populations. Preferably, the combination is a dry feed combination with the microencapsulated sodium nitrite of the present invention.

It will be appreciated that the term "feral" as used herein refers to the target pest species (i.e. omnivorous animals) which live wild such that their population or numbers cannot be easily controlled. In Australia, for instance, many feral animals such as dogs, goats, cats, and pigs, were originally introduced during British settlement as either domesticated species, species suitable for hunting, or where introduced for the purpose of possibly controlling yet other pests. After escaping into the wild such animals have become feral, adopting and flourishing to life unaided by human intervention. Many feral animals are introduced species and their presence in the wild is unwanted as they can adversely affect agricultural endeavours such as crop production and grazing. An example in New Zealand is the introduction of possums and in particular the common brush tail possum (*Trichosurus vulpecula*). Feral animals which are introduced species are distinguished from native or domesticated species. These feral animals also often cause adverse environmental impact, especially as their populations increase. Population of feral animals increase due to their vigour and survival rates, lack of natural predators and high reproduction rates and ability to adapt to a wide range of food sources. As such these feral animals have been classified as pests and it is desired to keep populations of such animals to a minimum or, where possible, to completely eradicate them from the wild or from areas of high agricultural or conservation value. It will be understood that while the bait of the present invention will not be able to distinguish between feral and non-feral domesticated animals, the bait is only intend to be used in the control of feral animal populations and accordingly suitable measures should be taken to ensure that the bait is not distributed amongst domesticated populations.

The term "active agent" referred to above is an agent which affects the physiology of the target feral animal in a desired manner. The active agent of the present invention is the salt sodium nitrite but it is recognised that other forms of nitrite would have similar effects and could also be used, such as for example potassium nitrite.

The present invention is predicated on the discovery that the integrity of nitrite salt containing baits can be severely compromised due to water/moisture either (i) by insufficient coating of the nitrite granules, and/or (ii) within the bait compositions due to pH incompatibilities.

The present inventors have derived the below scheme to account for the degradation of sodium nitrite in bait products:

$NaNO_2+HCl \rightarrow HNO_2+NaCl$

Nitrous acid then decomposes with itself:

$2HNO_2 \rightarrow NO_2+H_2O$ (thus potentially generating its own water)

Nitric oxide (NO) may also spontaneously and exothermically oxidise to $NO_2$ in air, then nitrogen dioxide ($NO_2$) can react with water and yield nitric acid and more nitrous acid:

$2NO_2+H_2O \rightarrow HNO_3+HNO_2$ $NaNO_2$ can also slowly oxidise to $NaNO_3$ in air and can react with amine groups to form nitrosoamines $NaNO_2$ can also potentially depotonate water to potentially provide its own acid for reaction with itself.

In relation to the reaction scheme depicted above the acid shown (HCl) could be any acid ($H^+$) and many bait carrier materials are characterised with acidic ingredients. Since other bait components such as wheat have a pH that is <7 it is found necessary to overcome this potential source of H+ ions. The present inventors have additionally found that stability of the bait product can be further increased by maintaining the bait product at a pH of greater than 7. Accordingly in some embodiments the bait composition disclosed herein further includes a pH stability agent. The pH stability agent can be any compound which is able to maintain the pH of the bait above pH 7 and preferably around about 7-8. Suitable stability agents include non-hygroscopic agents such as sodium carbonate (soda ash), sodium citrate, sodium acetate, sodium silicate, sodium sulphide, calcium carbonate, sodium bicarbonate, known phosphate buffers, or sodium/calcium hydroxide.

In an embodiment, the pH stability agent is added at a rate of about 50-110 grams per 60 kg of the entire bait composition, such as about 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108 or about 109 grams per 60 kg of the entire bait composition.

In an embodiment the bait composition has a water content of less than about 10% (w/w), such as less than 9%, less than 8%, less than 7%, less than 6%, less than 5%, less than 4%, less than 3%, or less than 2% wt/wt, or less than 1% wt/wt.

The water content of the bait can be substantially minimised by pre-drying the components of the bait composition while formulating the finished composition.

The present inventors have found that the presence of traces of water in a nitrite based composition may lead to the build up hydroxyl ions that can interact with some types of coatings that are sensitive to high pH, and also to the release of nitric oxide or other breakdown products arising from the reaction of nitrites with themselves or with other chemicals and/or bait components which can generate breakdown products including nitric oxide, nitrogen dioxide, nitrous acid and nitric acid that be detected by feral pigs, leading to voluntary uptake aversion. It has also been found that the salty flavour of nitrite baits compounds this problem by providing an aversive signal that limits the voluntary uptake of baits by feral pigs.

In order to improve upon known baits the inventors have developed a bait system to avoid nitrite degradation (i.e., increase stability) and to increase the palatability to the target species. In particular, the present inventors have investigated many encapsulation ingredients and have discovered that many ingredients do not satisfactorily coat the nitrite such as to prevent/minimise leaching of the nitrite which in turn compromises the effectiveness of the end bait product. The inventors have devised specific coating techniques, such as pan coating and especially fluid bed coating, which form a more complete coating of nitrite granules specifically with ethyl cellulose and linoleic acid between ratio ranges of ethyl cellulose:linoleic acid of 99:1 to 99.99: 0.01 as a % weight to weight ratio (% wt/wt) such as ethyl cellulose:linoleic acid of about 99.1:0.9, 99.2:0.8, 99.3:0.7, 99.4:0.6, 99.5:99.6:0.6; 99.7:0.3; 99.8:0.2; and about 99.9: 0.1 and ratios in between such figures.

The nitrite salt in the bait acts by causing methaemoglobin (Met Hb) formation in red blood cells, which prevents oxygen transport, and at specific doses causes rapid death by methaemoglobinaema. Accidental death by nitrite poisoning has been reported for domestic livestock such as pigs (see, for instance, Vyt, P et al, Viaams Diergeneeskundig Tijdschrift, 2005, 74, 359-363; Gibson. R., The Veterinary Record, Mar. 22, 1975, p 270; McParland, P. J., et al, The Veterinary Record, Mar. 1, 1980, p 201; Counters, D. E., et al, The Veterinary Record, May 3, 1975, p 412; Winks, W. R., The Queensland Journal of Agricultural Science, Vol. 7, No. 1 and 2, March and June 1950, pp 1-14; and London, W. T., et al, J.A.V.M.A, Vol 150, No. 4, pp 398-402.

From a report on the study of methemoglobin formation and reduction in various animals (see Smith & Butler., Am. J. Physiology. 210(2):347-350, 1966) it appears that the susceptibility to Met Hb formation may be related to the Met Hb reduction rate in such a way that a rapid oxidation of haemoglobin to methaemoglobin is offset by a rapid Met Hb reduction rate. In this study it was observed that pigs were particularly susceptible to methaemoglobinaema because of the pigs' inability to effectively reduce Met Hb. The reason for this is that pigs possess relatively low levels of methaemoglobin reductase enzyme which makes them highly susceptible to methaemoglobin forming compounds.

Also, nitrite salts act as effective toxins where poisoning and death occur rapidly and relatively or perhaps even totally painlessly. The mechanism of action provides the quick development of anoxia in the brain due to the reduced oxygen carrying capacity of methaemoglobin induced by the nitrite. Thus, one of the first symptoms of the toxicosis is the occurrence of unconsciousness, in much the same way as carbon monoxide acts. Carbon monoxide leads to the formation of carboxyheamoglobin that, like methaemoglobin does not carry oxygen to tissues effectively. Carbon monoxide has been used as a method to humanely dispose of unwanted animals and is considered to be one of the most humane techniques available for this process. This is to be contrasted with the severe clinical symptoms experienced with warfarin (bleeding in various organs leads to pain, e.g. lameness, etc.), phosphorous (e.g. liver failure and serious tissue damage leading to slow lingering death which results in feeling sick for a long period of time, etc.). Also the speed of death is very quick with nitrite so any symptoms are only experienced for a short period of time. Accordingly, an advantage of the baits of the present invention are that they provide a more humane alternative to existing feral omnivore baits and that the carcasses of poisoned animals may often be clustered near to points of baiting to enable carcasses recovery or assessment of impacts. However, this advantage is only realised if a sufficient quantity of the bait is consumed and the toxic contents (i.e., nitrite) is physiologically bioavailable within a short time period. A gradual uptake of the bait will cause insufficient methaemoglobin to achieve the desired rapid lethal outcome and may reduce the activity of the animal's activity so that further bait ingestion is disrupted. There is therefore a balance between stability of the nitrite and the ability of the encapsulated nitrite to release nitrite for effective pest control. The present inventors have developed baits which address this balance though the use of a combination of EC and LA at specific concentrations.

In an embodiment sodium nitrite used in the baits of the present invention as the active agent or core material, is presented in free flowing granular form. It also will be appreciated that "granular" refers to a conglomeration of discrete solid, macroscopic particles. This should be contrasted with non-granular forms such as powders, liquids or flakes. Preferably the granular size of the sodium nitrite is between 200 μm to 1 mm.

Larger granules than for instance greater than 1 mm, once coated, could be detected and excluded by the pig during feeding and may have lower resistance to mechanical disruption during processing such as mixing or extruding and packing. Smaller granules have a high ratio of coating to coated active ingredient and so are less suitable to the present application that requires large quantities of the active ingredient to be delivered to affect a lethal dose. The shape of the granules is typically irregular but can also be spherical. Preferably the granular form is prilled sodium nitrite. Such prilled salts are available in a commercial scale and are formed from a melted liquid. However the inventors recognised that an extruded formulation of sodium nitrite combined with a suitable binder and cut to short lengths would also provide a form of sodium nitrite that is suitable for coating by a fluid bed or pan coating process.

In an embodiment, prior to microencapsulation the moisture content of the sodium nitrite particles is less than 2% wt/wt, for instance, less than 1.5% wt/wt, 1.0% wt/wt, 0.9, 0.8, 0.7, 0.6%, 0.5%, 0.4%, 0.3%, 0.2%, or 0.1% wt/wt.

In a preferred embodiment the sodium nitrite comprises from about 5-15 wt/wt % of the total bait composition such as about 5 wt/wt %, 5.5 wt/wt %, 6 wt/wt %, 6.5 wt/wt %, 7 wt/wt %, 7.5 wt/wt %, 8.0 wt/wt %, 8.5 wt/wt %, 9.0 wt/wt %, 9.5 wt/wt %, 10 wt/wt %, 10.5 wt/wt %, 11 wt/wt %, 11.5 wt/wt %, 12 wt/wt %, 12.5 wt/wt %, 13 wt/wt %, 13.5 wt/wt %, 14 wt/wt %, 14.5 wt/wt %, or about 15 wt/wt %, or within a range between any of the two aforementioned values.

The present inventors have found that by preparing microspheres according to the present invention and delivering these microspheres into a bait composition such that the sodium nitrite comprises from about 5-15 wt/wt %, one is able to balance the requirement to have enough sodium nitrite to provide a lethal humane dose without the risk of excessive overdosing but too much poison such that, for instance, a pig will still be attracted to the bait and find the bait palatable.

Ethyl cellulose (EC) is a derivative of a cellulose in which some of the hydroxyl groups on the repeating glucose are presented as ethyl ether groups. The amount of ether groups may vary, for instance, between about 40-54% w/w ethoxyl.

Description of Ethyl Cellulose Types

| Type | Ethoxyl Content (%) | Degree of Substitution Groups per Anhydroglucose Unit |
|---|---|---|
| K-type | 45.0-47.2 | 2.22-2.41 |
| N-type | 48.0-49.5 | 2.46-2.58 |
| T-type | 49.6-51.5 | 2.58-2.73 |
| X-type | 50.5-52.5 | 2.65-2.81 |

It is however largely insoluble in water but freely stable in tetrahydroform, methyl acetate, chloroform, and in aromatic hydrocarbon ethanol mixture.

However, surprisingly when coating experiments were performed under these conditions no such nitrite degradation or water adsorption of the coating solution occurred. Without wishing to be bound by theory the present inventors surmise that the ethyl cellulose acts as a sequestering agent locking in the available water such that the nitrite is not exposed (to any great extent) to free water during the encapsulation process. 96-99% pure ethyl alcohol is economical and in the hands of the present inventors it has been shown that no appreciable increase in water content occurred in the ethyl cellulose microspheres using EC/LA/EtOH in a fluid bed process at 40° C. coating air temperature, or hotter in dehumidified air stream. Either the flex stream or wurster type fluid bed coating processes can be used but the inventors prefer the flex stream process as it allows for scaling of production. The size of the EC/LA microspheres as described herein is also seen to be a contributing factor to the stability properties for the encapsulated nitrite. If the microspheres are too big (for instance greater than 1 mm) there is a potential for osmotic effects to cause swelling and self-destruction. Too small (less than 100 nm) leads to stronger coating walls which in turn may lead to insufficient release of the nitrite under physiological conditions, hampering the delivery of humane and lethal dosages and also some loss of small spheres from to coater via police filters on exit air streams.

Linoleic acid also known as LA is fatty acid with formula $C_{18}H_{32}O_2$. It is often referred to by the shorthand 18:2 (n-6) or 18:2 cis-9,12.

The encapsulating material can be applied by spraying nitrite core particles with a solution of the coating material in a volatile solvent system using standard methods such as fluid bed or pan coating techniques. In certain embodiments the solvent is ethanol and in particular absolute ethanol.

In an embodiment encapsulated nitrite comprises about 2-15% wt/wt of the finished bait composition, for instance about 2.5% wt/wt, 3.5% wt/wt, about 4% wt/wt, about 4.5% wt/wt, about 5% wt/wt, about 5.5% wt/wt, about 6% wt/wt, about 6.5% wt/wt, about 7% wt/wt, about 7.5% wt/wt, about 8% wt/wt, about 8.5% wt/wt, about 9% wt/wt, about 9.5% wt/wt, about 10% wt/wt, about 11% wt/wt, about 12% wt/wt, about 13% wt/wt, about 14% wt/wt, or about 15% wt/wt, or within a range between any of the two aforementioned values.

In an embodiment the encapsulated nitrite composition comprises about 2-10% wt/wt of the final bait composition (i.e., carrier material and microencapsulated sodium nitrite).

In an embodiment the encapsulated nitrite composition comprises about 2-20% wt/wt of the final toxic feed composition (i.e., carrier material and microencapsulated sodium nitrite).

The encapsulated nitrite granules according to the present invention relating to baits can be mixed with a lipophilic carrier. The lipophilic carrier can be selected from the group consisting of lipophilic surfactants, vegetable oils, fatty acids and esters, fatty alcohol, glycerides, waxes and the like.

It would be appreciated however that the lipohilic carrier would need to be at least palatable to the target species and preferably palatable and attractive. In this regard the preferred lipophilic carrier is selected from vegetable oils and lipid based materials. In an embodiment selected from the group consisting of castor oil, peanut oil, corn oil, linseed oil, and sesame oil.

In an embodiment the carrier is a peanut oil paste (or just "peanut paste") and hence the bait may be in the form of a paste. Peanut paste is known in the food arts as a base material for peanut butter and is formed by roasting, blanching, and grinding raw peanuts so the paste contains peanut endosperm and peanut oil. In combination, with the encapsulated microspheres of the present invention, the present inventors have found that the stability of the nitrite in the bait, and therefore the bait itself, is greatly improved.

In an embodiment encapsulated nitrite comprises about 2-15% wt/wt of the finished bait composition, for instance about 2.5% wt/wt, 3.5% wt/wt, about 4% wt/wt, about 4.5% wt/wt, about 5% wt/wt, about 5.5% wt/wt, about 6% wt/wt, about 6.5% wt/wt, about 7% wt/wt, about 7.5% wt/wt, about 8% wt/wt, about 8.5% wt/wt, about 9% wt/wt, about 9.5% wt/wt, about 10% wt/wt, about 11% wt/wt, about 12% wt/wt, about 13% wt/wt, about 14% wt/wt, or about 15% wt/wt, or within a range between any of the two aforementioned values.

In an embodiment the encapsulated nitrite composition comprises about 2-10% wt/wt of the final bait composition (i.e., carrier material and microencapsulated sodium nitrite).

It is desirable to have a finished bait product that provides for usable shelf storage life at room temperatures or field temperatures but that is not so completely coated and shielded that the coating acts to disrupt the quick release of the active ingredient into the pig stomach soon after ingestion. This is because sodium nitrite is a mass active agent that will only induce lethal levels of methaemoglobinaemia if it is dumped quickly into the target animal system. A gradual delivery of a theoretically lethal acute dose will not reliably achieve the level of methaemoglobinaeimia needed for death. Thus in devising a protective coating a balance must be struck between protecting the nitrite from degradation or interaction with bait components and at the same time allowing for rapid bioavailability of the toxin once the bait is taken.

In an embodiment the bait composition is semi-solid, such as a paste.

In another embodiment the bait composition is substantially solid.

In another embodiment the toxic feed composition is a loose combination of carrier (pig feed ingredients) and the encapsulated sodium nitrite.

It will be appreciated that during typical baiting campaigns multiple baits are dispersed within the area of foraging of the target animal species. A single bait may not provide a lethal dose to a single target animal even if completely consumed. Preferably however the nitrite salt is in an amount which provides a lethal dose to a target feral animal after consumption of a small quantity of the bait material. That is, the quantity of nitrite salt in a single bait or a single edible portion of a larger bait offering is such that it will effectively kill a feral omnivorous animal. In an ideal situation the target animal does not eat too much of the bait or monopolise the bait but only eats an amount that is required to kill the animal. This enables many animals to be killed from a single offering of the bait and also minimises excessive poison loads within a carcass.

It will be appreciated that humanely euthanizing a farmed/domesticated pig population the toxic fee composition is administered in the normal way the pigs would expect to be feed. Preferably, a feeding provides a lethal dose. Preferably however the nitrite salt is in an amount which provides a lethal dose to a target feral animal after consumption of a small quantity of the bait material. That is, the quantity of nitrite salt in a single feeding or a single edible portion is such that it will effectively kill one or more pigs in the pig population.

It would be appreciated that the lethal dose of a nitrite salt to kill a pig will typically depend on the species physiology and weight. In respect of pigs the lethal dose is preferably at least 135 mg of nitrite salt/kg body weight of the pig. Accordingly, for a pig weighing 60 kg, to provide a lethal dose a single bait would need to comprise at least 5 g of the nitrite salt. Accordingly, as most adult pigs encountered under typical conditions may weigh anywhere between approximately 10-200 kg the preferred amount of nitrite salt in a single bait portion is between 1.35 g-270 g. More preferably the preferred amount of nitrite salt in a single bait or bait portion consumed is less than 30 g and even more preferably less than 20 g, for instance less than 15 g.

For the present invention which is directed to the control of feral omnivores, such as feral pigs, the bait may also comprise additional food sources which are attractive, palatable and edible to the target omnivore.

Examples of suitable plant derived components include pollard, bran, maize (corn), plant fibres, flour, fruit, vegetables, seeds, cereal and straw.

In another embodiment the compositional ingredient is selected with non-target species in mind such that the potential uptake of the bait by non-target species is reduced. Thus, the selection of the particular type and amount of components which make up the bait composition may vary depending on the non-target species which are to be avoided. For instance, in the case where the non-target species are herbivores (e.g. specific bird species, marsupials, etc., which do not eat meat) the carrier material may be selected to comprise of mainly animal derived components. This is particularly preferred when targeting feral pigs in Australia where the majority of non-target native species have a restricted dietary range and where many non-target species are obligate herbivores or graniferous birds that are less attracted to am omnivore bait.

The selection of bait matrix components must also consider the moisture content of the carrier material or attractive agent. In an embodiment the carriers is a mixture of corn and wheat and wheat flour that is pre-dried to minimise the moisture content to levels below this naturally occurring in such grains.

The bait may also include specific chemical attractants, such as flavourants or scented substances (odourants). The chemical attractant may be a natural or artificial essence, such as banana, honey, aniseed, molasses, cinnamon oil and chocolate. The carrier material may also comprise other additives known in the art such as colourants, preservatives, binders, fillers, and the like. The choice of colorants is important as nitrite can react with agents that contain amide groups and once exposed to water nitrite can produce an alkaline solution that can change the colours of some dyes. The use of an inert and stable dye is preferred. For instance, in a preferred embodiment the carrier material contains a colourant (dye) which makes the bait black in colour to mask the bait from non-target species such as birds which generally have a preference for eating yellow and red coloured food consistent with ripe fruit. For instance, in an embodiment the composition comprises an amount of iron (ferric) oxide to turn the composition to grey or black. The selection of a dye must also have regard to cost and the potential for reaction between the active ingredient sodium nitrite and the colourant. Ferric oxide is an inert colorant that is suitable for this purpose, whereas dyes containing amide groups are less suitable because of their potential to react with the active ingredient. Water soluble dyes cannot be used easily. Also, preservatives, antioxidants, and binding agents may be added to provide mechanical strength to the finished bait and to reduce the risk of premature degradation on storage.

In order to further ensure stability the compositions can also be packaged in barrier laminated trays with plastic seals and have planned to use nitrogen purging of the trays prior to sealing to remove oxygen from the head space as a method to further reduce the level of oxidation of the nitrite.

Furthermore, in order to increase the target specificity the bait may also include repellents of other non-target species such as methyl anthranilate which is a known bird repellent.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Certain embodiments of the invention will now be described with reference to the following examples which are intended for the purpose of illustration only and are not intended to limit the scope of the generality hereinbefore described.

EXAMPLES

Example 1—Preparation of an Encapsulated NaNO$_2$ with Zein/Plasticizer Mixtures

Methods

Encapsulating Granules

NaNO$_2$ (SN) granules (food grade E250, BASF) approximately 0.2-1.0 mm and EC were used as supplied. The BASF SN is free flowing and has an anticaking agent (amorphous silicone dioxide at about 0.1% w/w). We also pre-sieve the SN to achieve a more uniform particle size range from 100 to 1000 microns diameter by removing the fines (<100 microns). NaNO$_2$ granules were optionally dried in a commercial oven for 12 hours at 60° C. to remove any residual moisture. NaNO$_2$ granules (500 g) were coated using a pan coating process; EC (9.975%, or 9.95%, or 9.90%) was dissolved in 95-96% ethanol (90%) and LA was added at 0.025%, or 0.05%, or 0.10% to make a mixture containing EC and LA. To coat the NaNO$_2$, 500 g of granules were placed in a spherical pan, the pan was rotated at 20 revolutions per minute, the liquid encapsulant solution was sprayed onto the granules at one litre per hour while the whole was warmed to 40° C. by warm predried air directed onto the granule bed to progressively evaporate the solvents. Once all coating material was applied the granules continued to be rotated to ensure drying.

Scanning Electron Microscope Inspection of Encapsulated Granules $NaNO_2$ coated in each of the four different solutions outlined above as well as uncoated $NaNO_2$ granules were assessed visually using a scanning electron microscope (SEM) (Philips XL30S FEG, Netherlands). Samples were sputter coated with gold for 2 min (Quorum Technologies Polaron SC 7640 sputter coater, England) and viewed at an accelerating voltage of 5 kV. Samples were viewed and photographed at either 54× or 55× magnification and then at 250× and 1000× magnification. Samples were observed for the potential aggregation of granules as well as for cracks in the surface of coated formulations.

Cast Film and Mechanical Properties

EC/LA coating formulations were cast to form films to assess mechanical properties using a texture analyzer (TA-XT2i instrument, Stable Micro-system, UK).

Solutions were poured into a plastic petri dish (10 cm×10 cm) and left to set for 24 hours in a fume hood at room temperature. Films were then removed from dishes and held between two plates with aligned 10 mm openings. A probe (¼" ball probe at 1 mm/s) was applied to assess break strength of each of the films testing six fresh sections of film each time. The maximum force required for the probe to rupture the test sample was recorded.

Cast Film Water Transmission and Water Absorption

Films were cast using ethanol (80% w/w) solutions, as described above. From the cast films, four small circular sections (approx. 12 mm in diameter) of film were cut. Each circular section of film was placed on the inside of the screw top lid of a separate Hungate anaerobic culture tube. The lids had holes in them, approx. 9 mm in diameter, and the circular pieces of film covered those holes, the lids were screwed on the test tubes so that the films provided a barrier. Approx. 5 g of $CaCl_2$ was placed inside each test tube. Twelve test tubes (four for each film tested) were placed in a beaker inside a sealed plastic container alongside a beaker containing $NaCl_2$ moistened till visibly wet with water. The saturated solution of $NaCl_2$ and water inside the sealed container provided a stable and constant environment and humidity. The water gain of each tube was measured by weighing each assembled tube prior to the trial and then at set time points after 1, 2, 3 and 4 hours and then daily until day seven.

Example 2—Preparation of Encapsulated Bait Composition a) Formulation Components The ratio of these ingredients is:

| Sodium Nitrite | 100% | 90% End microsphere |
|---|---|---|
| Encapsulants as a coat one - as a % of the Sodium Nitrite | | |
| Ethanol | 90.000% | Evaporated |
| Water | 0% | Evaporated |
| EC | 9.975% | Total of 10% |
| LA | 0.025% | | b) Formulation Process (Coated Pan)

Technical grade prilled sodium nitrite—(200-800 μm) was obtained from BASF. The sodium nitrite is heated in a coating pan at 45 deg C. for 30 minutes with the pan being jogged during this process. At the end of this process, the moisture content should be <0.1%.w/w.

The encapsulant comprising EC/LA is mixed/dissolved in 96% Ethanol.

The coated nitrite is then formulated with a palatable carrier that further protects the nitrite from degradation and offers the mixture in a palatable form for the feral pig to eat. In this carrier bait consists of peanut paste and peanut oil mixed with dried ground cereals including wheat and corn and wheat flour to form a firm paste constancy. The final concentration of nitrite in the finished paste was about 10% wt/wt so that a pig is killed if it eats in the region of 15 to 200 grams of the bait paste. This paste was packaged into trays that allow ready access to the paste by the pigs. Trials have shown that feral pigs tend to not overeat this paste so that large numbers of pigs from a group of pigs feeding together can be killed with a small quantity of paste offered at one site of localised pig abundance.

Field Trial

In an example a group of pigs were clustered into feeding areas or baiting stations, by first identifying a point where pigs were traversing to find food or water. Such a transit point is easily identified by observing pig tracks on the ground or by signs of pigs rubbing on trees or defecating or by the use of remote triggering cameras that are well known in the field. Pigs are then encouraged to feed at the chosen site by being offered typical food such as grain like wheat or corn. Once it is observed that the pigs are regularly visiting and feeding at the site the poisoned bait material is offered or the bait material is first offered in an un-poisoned form to further accustom the pigs to the feed at the site followed the next night by offering the poisoned version of the bait.

The pigs then eat the poisoned bait and are quickly killed with many carcasses found the next morning within a short distance of the baited area. This fast knock down of the affected animals enables easy assessment of the effectiveness of the bait and also easy recovery of the carcasses for disposal, if needed.

This paste had been stored for three months under standard field conditions without temperature control for three months prior to testing confirming that the formulation had retained its lethal efficacy and palatability to pigs after extended storage after manufacture.

These field tests thus confirm that the bait is palatable to and taken up by unrestrained feral pigs and that the poison is released or bioavailable in such quantities to kill a high proportion of the animals visiting the feeding site. Moreover, a large number of animals, ranging in liveweight from 10 to 90 kg were killed from a single tub containing 10 kg of bait (first example) or a plastic tray containing 5 kg of bait (example 2) so no individual monopolises large quantities of bait.

Example 3—Preparation of Encapsulated Microspheres (EC/LA Based)

Production Method for Spheres:

Prilled sodium nitrite with a moisture content of less than 1% (typically around 0.2 to 0.3%) and a particle size distribution of 180 to 800 microns is suspended as a fluidised bed in a stream of air drawn into the coating apparatus at 80% relative humidity at 12° C. and which is pre-heated heated to 40 to 45° C. Coating material for EC is prepared by fully dissolving 9.95% w/w EC in 96% ethyl alcohol and containing 0.05% LA as a plasticiser to form the coating solution.

The coating solution is sprayed on the fluidised bed of sodium nitrite granules initially at a low rate initially and then at a progressively increasing rate to provide an even and uniform coating layer until 2.5 to 25% coating of the particles with EC/LA is achieved, typically 5% w/w of the finished product. The finished coated microsphere product that in this example is 95% sodium nitrite and 5% EC/LA is further dried by a flow of heated air to remove all solvents prior to packing. Variations on the above produced EC/LA microencapsulated sodium nitrite microspheres with various % coating of zein.

Example 4—Bait Production Using Microspheres from Example 3

A palatable bait containing sodium nitrite is prepared by mixing cracked wheat, fine crushed maize, white wheat flour, sugar, iron oxide (colourant) and sodium carbonate (as a pH modifier) until uniform colour is achieved in a ribbon blender. Then the required quantity of microencapsulated sodium nitrite microspheres is added and fully mixed with the dry ingredients before the whole mixture is bound together with a quantity of ground peanut paste to achieve a semi solid paste like consistency at room temperature.

Example 5—Palatability, Lethality and Stability

Palatability, lethality, and stability of the bait (i.e., fresh compared to 8-month-old bait) were examined on groups of captive invasive wild pigs. Consumption of bait resulted in 95% mortality (53 of 56) in the treatment groups across 2 treatment nights. Most mortalities (98%) occurred during the first night the toxic bait was offered. Camera evidence suggested that deaths occurred within 3 hr post-offering. The toxic bait was stable and effective up to 10 months post manufacture.

The toxic bait remained palatable after being stored at ambient temperature and humidity for 10 months. This indicated that the micro-encapsulation coating remained intact to keep the salty tasting sodium nitrite concealed during this time and protected the bait matrix from adverse interactions with sodium nitrite leading to aversive break-down products.

Example 6—Top Dress Study Using Toxic Feed Composition

The toxic feed composition comprises microencapsulated sodium nitrite and milled grain.

TABLE 1

| | | | | Mean times (minutes) to significant clinical signs of SN poisoning in domestic pigs | | | |
|---|---|---|---|---|---|---|---|
| Treatment | Pen | Time to first down | Time to last down | Time to non-resposive | Time to death | Last down to death | Non-responsive to death |
| Paste | 1 | 38 | 62 | 75 | 82 | 20 | 7 |
| | 2 | 24 | 55 | 68 | 73 | 18 | 5 |
| | 3 | 30 | 59 | 75 | 79 | 20 | 4 |
| | Treatment mean | 31 | 59 | 72 | 78 | 19 | 5 |
| Top dress | 4 | 36 | 72 | 86 | 92 | 19 | 6 |
| | 5 | 42 | 71 | 88 | 95 | 24 | 7 |
| | 6 | 43 | 91 | 105 | 114 | 23 | 9 |
| | Treatment mean | 40 | 78 | 93 | 100 | 22 | 7 |
| | Overall mean | 35 | 68 | 83 | 89 | 21 | 6 |

Example 7—Top Dress Study Using Toxic Feed Composition

Table 2—The toxic feed composition: (1) microencapsulated sodium nitrite and milled grain and (2) microencapsulated sodium nitrite and milled grain, peanut butter toxic paste.

Pen 1 (male)—3×625 g pallets less 200 g given; 363 gm scraped out

Pen 2 (female)—3×625 g pallets given; 116 gm scraped out; NONE drank water (their choice)

Pen 3 (male)—3×625 g pallets given; 370 gm scraped out

Pen 4 (female)—4×40 gm on top of 4×400 gm pellets

Pen 5 (male)—4×40 gm on top of 4×400 gm pellets

Pen 6 (female)—4×40 gm on top of 4×400 gm pellets; *extra access by "blank" to neat toxin

| Pen | Pig ID | Pig ID marking | Entry wt Dec. 4, 2021 | Tx type | Time Tx commenced | First down | Last down | Non-responsive | Death | Time 0 to death | Time last down to death | Time non-responsive to death |
|---|---|---|---|---|---|---|---|---|---|---|---|---|
| 1 | 48774 | splotch | 51 | paste | 9.27am | 9.52am | 10.00am | 10.10am | 10.16am | 49 min | 16 min | 6 min |
| 1 | 48767 | cross | 51 | paste | 9.27am | 10.19am | 10.53am | 11.14am | 11.15am | 1 h 48 min | 22 min | 1 min |
| 1 | 48758 | circle | 55 | paste | 9.27am | 10.20am | 10.37am | 10.52am | 11.03am | 1 h 36 min | 26 min | 11 min |
| 1 | 48713 | stripe | 53 | paste | 9.27am | 9.50am | 10.27am | 10.33am | 10.42am | 1 h 15 min | 15 min | 9 min |
| 2 | 48644 | stripe | 54 | paste | 11.20am | 11.42am | 11.53am | 12.01pm | 12.03pm | 43 min | 10 min | 2 min |
| 2 | 48682 | nil | 53 | paste | 11.20am | 11.38am | 12.01pm | 12.20pm | 12.32pm | 1 h 12 min | 31 min | 12 min |

-continued

| Pen | Pig ID | Pig ID marking | Entry wt Dec. 4, 2021 | Tx type | Time Tx commenced | First down | Last down | Non-responsive | Death | Time 0 to death | Time last down to death | Time non-responsive to death |
|---|---|---|---|---|---|---|---|---|---|---|---|---|
| 2 | 48693 | cross | 53 | paste | 11.20am | 11.50am | 12.51pm | 1.02pm | 1.05pm | 1 h 45 min | 14 min | 3 min |
| 2 | 48663 | triangle/ blotch | 53 | paste | 11.20am | 11.46am | 12.15pm | 12.27pm | 12.30pm | 1 h 10 min | 15 min | 3 min |
| 3 | 48728 | cross | 50 | paste | 12.45pm | 1.35pm | 1.59pm | 2.26pm | 2.28pm | 1 h 43 min | 29 min | 2 min |
| 3 | 48748 | spot | 55 | paste | 12.45pm | 1.11pm | 1.35pm | 1.45pm | 1.50pm | 1 h 5 min | 15 min | 5 min |
| 3 | 48766 | nil | 47 | paste | 12.45pm | 1.04pm | 1.30pm | 1.48pm | 1.49pm | 1 h 4 min | 19 min | 1 min |
| 3 | 48765/ 775 | stripe | 52 | paste | 12.45pm | 1.10pm | 1.50pm | 1.59pm | 2.08pm | 1 h 23 min | 18 min | 9 min |
| 4 | 48654 | stripe face | 55 | top dress | 9.10am d2 | 10.04am | 10.30am | 10.38am | 10.45am | 1 h 35 min | 15 min | 7 min |
| 4 | 48657 | cross | 50 | top dress | 9.10am d2 | 9.37am | 10.14am | 10.28am | 10.31am | 1 h 21 min | 17 min | 3 min |
| 4 | 48670 | blank | 54 | top dress | 9.10am d2 | 9.43am | 10.20am | 10.38am | 10.45am | 1 h 35 min | 25 min | 7 min |
| 4 | 48667 | stripe/ blotch | 49 | top dress | 9.10am d2 | 9.38am | 10.25am | 10.39am | CHECK VIDEO | 1 h . . . | | |
| 5 | 48755 | Black stripe | 55 | top dress | 11.00am d2 | 11.38am | 12.12pm | 12.35pm | 12.43pm | 1 h 43 min | 31 min | 8 min |
| 5 | 48709 | Black cross | 55 | top dress | 11.00am d2 | 11.49am | 12.13pm | 12.25pm | 12.32pm | 1 h 32 min | 19 min | 7 min |
| 5 | 48756 | Black spot | 51 | top dress | 11.00am d2 | 11.45am | 12.13pm | 12.34pm | 12.42pm | 1 h 42 min | 29 min | 8 min |
| 5 | 48747 | Blank | 50 | top dress | 11.00am d2 | 11.37am | 12.06pm | 12.19pm | 12.22pm | 1 h 22 min | 16 min | 3 min |
| 6 | 48698 | Blue stripe | 52 | top dress | 1.00pm d2 | 1.30pm | 2.33pm | 2.44pm | 2.51pm | 1 h 51 min | 18 min | 7 min |
| 6 | 48691 | Blue spot | 55 | top dress | 1.00pm d2 | 1.31pm | 2.04pm | 2.23pm | 2.32pm | 1 h 32 min | 26 min | 9 min |
| 6 | 48675 | Blank | 49 | top dress | 1.00pm d2 | 2.19pm | 2.19pm | 2.30pm | 2.42pm | 1 h 42 min | 23 min | 12 min |
| 6 | 48701 | Blue cross | 55 | top dress | 1.00pm d2 | 1.31pm | 3.08pm | 3.22pm | 3.30pm | 2 h 30 min | 22 min | 8 min |

The invention claimed is:

1. Ethyl cellulose/linoleic acid (EC/LA) microencapsulated sodium nitrite microspheres, wherein the ratio range of ethyl cellulose to linoleic acid is in an amount from about 99:1 to about 99.99:0.01 as a % weight to weight ratio.

2. Microspheres according to claim 1 wherein ethyl cellulose/linoleic acid coating material is added to the sodium nitrite to form the microspheres at from about 2.5 to 30% weight to weight based on ethyl cellulose/linoleic acid to sodium nitrite.

3. Microspheres according to claim 2 wherein the amount of ethyl cellulose/linoleic acid is about 5% by weight relative to the amount of sodium nitrite.

4. A bait composition comprising a carrier material and sodium nitrite, wherein the sodium nitrite is presented in the form of ethyl cellulose/linoleic acid microencapsulated sodium nitrite microspheres as defined in claim 1.

5. The bait composition according to claim 4 wherein the carrier material is pig feed.

6. A bait composition for omnivorous feral animals comprising a carrier material and sodium nitrite, wherein the carrier material is a lipophilic carrier and the sodium nitrite is presented in the form of ethyl cellulose/linoleic acid microencapsulated sodium nitrite microspheres, wherein the ratio range of ethyl cellulose to linoleic acid is in an amount from about 99:1 to about 99.99:0.01 as a % weight to weight ratio.

7. The bait composition according to claim 6, wherein the ethyl cellulose/linoleic acid coating material is added to the sodium nitrite to form the microspheres at from about 2.5 to 30% weight to weight based on ethyl cellulose/linoleic acid to sodium nitrite.

8. The bait composition according to claim 6, wherein the ethyl cellulose/linoleic acid coating material is added to the sodium nitrite to form the microspheres at from about 2.5 to 30% weight to weight based on ethyl cellulose/linoleic acid to sodium nitrite, and the carrier material comprises a pH stability agent such that the bait maintains a pH of greater than 7.

9. A method for humanely controlling omnivorous feral animals, including the step of dispersing within the area of foraging of said omnivorous feral animals a bait composition according to claim 7.

10. The method according to claim 9, wherein the omnivorous feral animals are feral pigs or possums.

11. A method for humanely controlling housed pig populations including the step of dispersing within the pigs' housing a bait composition comprising ethyl cellulose/linoleic acid (EC/LA) microencapsulated sodium nitrite microspheres according to claim 1 and pig feed.

12. The method according to claim 11 wherein the pig population is infected with African Swine Fever (ASF).

13. A method of preparing a bait composition for omnivorous feral animals comprising a lipophilic carrier material and sodium nitrite, wherein the sodium nitrite is presented in the form of ethyl cellulose/linoleic acid microencapsulated sodium nitrite microspheres, wherein the ratio range of ethyl cellulose to linoleic acid is in an amount from about 99:1 to about 99.99:0.01 as a % weight to weight ratio, said method comprising:

(a) obtaining granular sodium nitrite and optionally drying the granular sodium nitrite to constant weight, thereby indicating that substantially all moisture is removed;

(b) encapsulating the granular sodium nitrite from step (a) with a mixture of the ethyl cellulose and linoleic acid by either pan coating or fluid bed coating techniques using a volatile organic solvent; and (c) mixing the encapsulated material with the carrier material to form the bait composition.

14. The method according to claim 13, wherein the granular sodium nitrite is optionally dried to constant weight, thereby indicating that substantially all moisture is removed, the carrier material comprises a pH stability agent such that the bait maintains a pH of about 7-8, and the amount of ethyl cellulose/linoleic acid is about 3.5 to 20% by weight relative to the amount of sodium nitrite.

15. The method according to claim 14, wherein the pH stability agent is sodium carbonate.

16. The method according to claim 14 wherein the volatile organic solvent is water free.

17. The method according to claim 13 wherein the volatile organic solvent is water free.

18. The method according to claim 13 wherein the volatile organic solvent is absolute ethanol.

19. The method according to claim 13, wherein the omnivorous feral animals are feral pigs or possums.

20. A method for humanely controlling omnivorous feral animals, including the step of dispersing within the area of foraging of said omnivorous feral animals a bait composition according to claim 8.

\* \* \* \* \*